United States Patent
Nam et al.

(10) Patent No.: US 10,045,398 B2
(45) Date of Patent: Aug. 7, 2018

(54) WIRELESS POWER RECEIVER

(71) Applicant: Samsung Electro-Mechanics Co., Ltd., Suwon-si (KR)

(72) Inventors: Isaac Nam, Suwon-si (KR); Ki Won Chang, Suwon-si (KR); Choon Hee Kim, Suwon-si (KR); Hyun Keun Lim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 245 days.

(21) Appl. No.: 14/844,484

(22) Filed: Sep. 3, 2015

(65) Prior Publication Data

US 2016/0087451 A1    Mar. 24, 2016

(30) Foreign Application Priority Data

Sep. 23, 2014 (KR) .................. 10-2014-0127204
Dec. 29, 2014 (KR) .................. 10-2014-0192139

(51) Int. Cl.
*H02J 50/12* (2016.01)
*H04W 88/02* (2009.01)
*H04B 5/00* (2006.01)
*H02J 50/10* (2016.01)
*H02J 50/80* (2016.01)

(52) U.S. Cl.
CPC .............. *H04W 88/02* (2013.01); *H02J 50/10* (2016.02); *H02J 50/80* (2016.02); *H04B 5/0037* (2013.01); *H04B 5/0031* (2013.01); *H04B 5/0075* (2013.01)

(58) Field of Classification Search
CPC .. H02J 50/12; H02J 50/15; H02J 50/20; H02J 50/40; H02J 50/60; H02J 50/80; H02J 50/90; H02J 5/005; H02J 7/025; H02J 7/027
USPC ........................................................ 307/104
See application file for complete search history.

(56) References Cited

U.S. PATENT DOCUMENTS

| | | | |
|---|---|---|---|
| 8,628,012 B1 | 1/2014 | Wallner | |
| 2011/0115303 A1* | 5/2011 | Baarman | H02J 17/00 307/104 |
| 2011/0285211 A1* | 11/2011 | Endo | H02J 17/00 307/104 |
| 2012/0149301 A1 | 6/2012 | Wiley | |
| 2014/0140420 A1* | 5/2014 | Ghovanloo | H04W 52/0209 375/259 |
| 2014/0265610 A1 | 9/2014 | Bakker et al. | |

(Continued)

FOREIGN PATENT DOCUMENTS

| | | |
|---|---|---|
| CN | 103270703 A | 8/2013 |
| CN | 103683523 A | 3/2014 |

(Continued)

OTHER PUBLICATIONS

Extended European Search Report dated May 12, 2016 in counterpart European Application No. 15184618.5 (8 pages).

(Continued)

*Primary Examiner* — John Poos
(74) *Attorney, Agent, or Firm* — NSIP Law

(57) ABSTRACT

A wireless power receiver includes a resonance circuit, a power receiver, and a data transmitter. The power receiver is configured to control the resonance circuit to receive wireless power. The data transmitter is configured to control the resonance circuit to transmit data.

19 Claims, 7 Drawing Sheets

(56) References Cited

U.S. PATENT DOCUMENTS

2015/0145473 A1   5/2015  Shen et al.
2015/0244176 A1   8/2015  Van Den Brink et al.

FOREIGN PATENT DOCUMENTS

| CN | 103683530 A | 3/2014 |
|----|----|----|
| JP | 2001-307032 A | 11/2001 |
| JP | 2010-141966 A | 6/2010 |
| JP | 2014-124021 A | 7/2014 |
| KR | 10-2011-0056344 A | 5/2011 |
| KR | 10-2013-0029178 A | 3/2013 |
| WO | WO 2010/035256 A2 | 4/2010 |
| WO | WO 2012/082570 A1 | 6/2012 |
| WO | WO 2014/039088 A1 | 3/2014 |

OTHER PUBLICATIONS

Korean Office Action issued in counterpart Korean Application No. 10-2014-0192139 dated Apr. 11, 2016 (10 pages in English; 6 pages in Korean).

Chinese Office Action dated Jun. 22, 2017 in corresponding Chinese Patent Application No. 201510600818.1 (10 pages in English and 6 pages in Chinese).

* cited by examiner

WIRELESS POWER RECEIVER

CROSS-REFERENCE TO RELATED APPLICATIONS

This application claims the benefit under 35 USC 119(a) of Korean Patent Application Nos. 10-2014-0127204 filed on Sep. 23, 2014 and 10-2014-0192139 filed on Dec. 29, 2014, with the Korean Intellectual Property Office, the disclosures of which are incorporated herein by reference.

BACKGROUND

1. Field

The present disclosure relates to a wireless power receiver.

2. Description of Related Art

As a result of on-going developments in wireless technology, various wireless functions, ranging from the transmission of data to the transmission of power have become possible.

Wireless power transmission uses a magnetic field induced between pair of coils to produce wireless power. For example, wireless power transfer technology provides wireless power using a magnetic resonance scheme.

Furthermore, a portable terminal to which wireless power transfer technology is applied uses additional coils, in addition to a coil for wirelessly transmitting power, for wireless communication. Therefore, several coils are included in a single portable terminal, increasing the possibilities of producing interference between the coils. Further, a size of the portable terminal is greater as a space to hold the coils is increased.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a wireless power receiver, including a resonance circuit; a power receiver configured to control the resonance circuit to receive wireless power; and a data transmitter configured to control the resonance circuit to transmit data.

The resonance circuit may include a resonance tank, and a rectifying circuit comprising switches.

The power receiver may provide a first driving signal for receiving wireless power to the switches.

The data transmitter may provide a second driving signal to transmit the data to the switches.

The data may include card information, and the second driving signal may be a series of square waves to transmit the card information.

The rectifying circuit may convert the data represented by the square waves into a wireless communications waveform.

The power receiver may operate mutually exclusively to the data transmitter.

The resonance tank may be magnetically coupled to a transmitting coil of an external wireless power transmitter.

The resonance tank may be magnetically coupled to a coil of an external magnetic card reader.

The wireless power receiver may also include a controller configured to control so that one of the power receiver or the data transmitter is operated.

In accordance with an embodiment, there is provided a wireless power receiver, including a resonance circuit comprising a resonance tank and switches connected to the resonance tank; and a driving circuit applying a driving signal to the switches so that the resonance circuit receives wireless power or transmits data.

The switches may be included in a converter converting the data input as the driving signal into a wireless communications waveform.

The switches may be included in a rectifying circuit rectifying a current received by the resonance tank.

The wireless power receiver may also include a power receiver configured to provide a first control signal for receiving wireless power to the driving circuit and a data transmitter providing a second control signal for transmitting the data to the driving circuit.

The switches may include first and second switches connected to one end of the resonance tank, and third and fourth switches connected to the other end of the resonance tank, wherein the power receiver may generate the first control signal to operate the second and third switches after the first and fourth switches are operated.

The resonance circuit may receive wireless power using a frequency of 350 kHz or less, and transmits the data using a frequency of 50 kHz to 300 kHz.

In accordance with another embodiment, there is provided a resonance circuit, including a resonance tank comprising a coil and a capacitor and magnetically coupled to a wireless power transmitter to receive wireless power or magnetically coupled to a card reader to transmit data; and a rectifying circuit comprising switches connected to the resonance tank and configured to wirelessly receive or rectify the power or transmit the data based on a driving signal.

The rectifying circuit may be configured to perform a switching operation according to the driving signal to rectify a current received at the resonance tank.

The rectifying circuit may perform a switching operation according to the driving signal to allow the resonance tank to transmit the data or to receive the wireless power.

The switches may be operated according to the driving signal input from a data transmitter or a power receiver.

The power receiver and the data transmitter may operate in a mutually exclusive manner.

A driving circuit may receive the driving signal from the power receiver or the data transmitter, and may apply the driving signal to the switches so that the resonance circuit receives the wireless power or transmits the data.

First and second switches may be connected to one end of the resonance tank and third and fourth switches may be connected to another end of the resonance tank, wherein a control signal may control the second and third switches to operate after the first and fourth switches are operated.

The switches may be in a converter configured to convert the data into a wireless communications waveform.

Other features and aspects will be apparent from the following detailed description, the drawings, and the claims.

BRIEF DESCRIPTION OF DRAWINGS

The above and other aspects, features and other advantages of the present disclosure will be more clearly understood from the following detailed description taken in conjunction with the accompanying drawings, in which.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
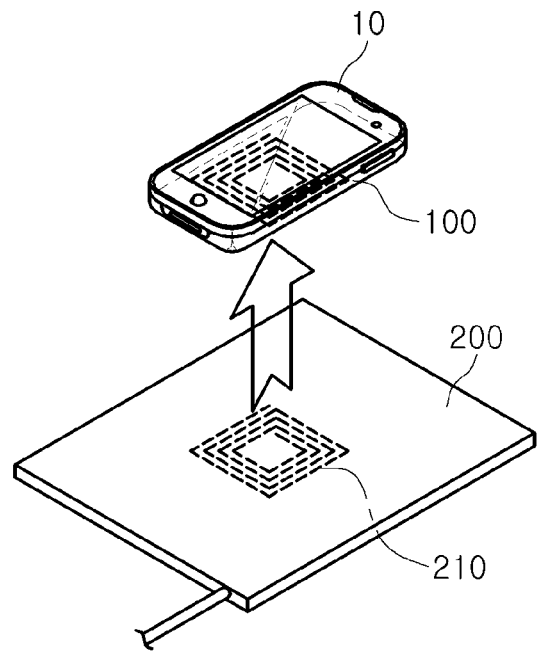
FIG. 1 is a perspective view of a wireless power receiver, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

It will be understood that when an element or layer is referred to as being "on" or "connected to" another element or layer, it can be directly on or connected to the other element or layer or through intervening elements or layers may be present. In contrast, when an element is referred to as being "directly on" or "directly connected to" another element or layer, there are no intervening elements or layers present. Like reference numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. These terms do not necessarily imply a specific order or arrangement of the elements, components, regions, layers and/or sections. Thus, a first element, component, region, layer or section discussed below could be termed a second element, component, region, layer or section without departing from the teachings description of the present invention.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a perspective view of a wireless power receiver, according to an embodiment.

In the example illustrated in FIG. 1, a wireless power receiver 100 receives power wirelessly from a wireless power transmitter 200 and provides power to a portable terminal 10.

The wireless power receiver 100 receives power wirelessly transmitted from the wireless power transmitter 200 in a non-contact manner. The wireless power receiver 100 includes a resonance circuit, where the resonance circuit resonates with a transmitting coil Lp of the wireless power transmitter 200 to receive power wirelessly.

The wireless power transmitter 200 and the wireless power receiver 100 are not limited to a specific wireless charging standard. For example, the wireless power transmitter 200 and the wireless power receiver 100 may be operated using a wireless charging standard, such as, Alliance for Wireless Power (A4WP), using a separate local area wireless communications network. Alternatively, as another example, the wireless power transmitter 200 and the wireless power receiver 100 are also operated using wireless charging standards, such as, Wireless Power Consortium (WPC) and Power Matters Alliance (PMA), which do not use the separate local area wireless communications. The wireless power transmitter 200 includes a resonance tank 210 to transmit wireless power to and communicate with a resonance circuit 110 (see, for example, FIG. 3) in the portable terminal 10. Detailed descriptions of the structure and function of the resonance circuit 110 and the resonance tank 210 are described in the following descriptions associated with FIGS. 3 through 10.

Figure 2:
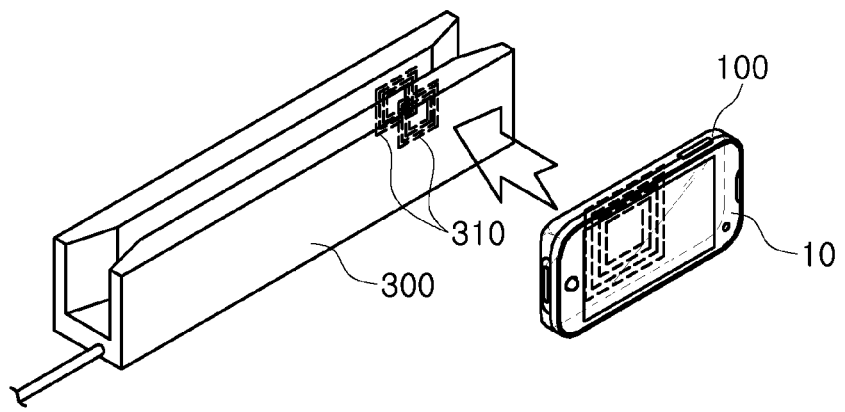
FIG. 2 is a perspective view of another wireless power receiver, according to an embodiment.

FIG. 2 is a perspective view of another wireless power receiver, according to an embodiment.

In the example illustrated in FIG. 2, the wireless power receiver 100 in the portable terminal 10, for instance, receives wireless power and transmits data, such as, data corresponding to card information of the portable terminal 10, from and to an external card reader 300 in a wireless, non-contact manner.

That is, the wireless power receiver 100 receives wireless power using the resonance circuit 110 integrated therein or transmits the data using the resonance circuit 110. In one configuration, the resonance circuit 110 may be integrated with the wireless power receiver 100, or may be external to the wireless power receiver 100.

According to an embodiment, the card reader 300 is a card slide type magnetic card reader. The magnetic card reader reads card information by recognizing a magnetic strip on the card.

That is, the magnetic card reader includes a coil and a magnetic body. The coil of the magnetic card reader and the magnetic strip of the magnetic card magnetically interface with each other, and the magnetic card reader obtains the card information from the magnetic strip using magnetic interface.

Therefore, the magnetic card reader includes a magnetic coupling enabled coil and the resonance circuit of the wireless power receiver 100 is magnetically coupled to the coil of the magnetic card reader to read the data from the portable terminal 10.

According to an embodiment, the resonance circuit 110 of the wireless power receiver 100 transmits the data to the magnetic card reader 300 through magnetic coupling with the coil of the card reader 300. For example, the wireless power receiver 100 transmits the card information to the card reader 300 using the resonance circuit 110.

According to another embodiment, the card reader 300 satisfies a local area wireless communications standard to wirelessly receive data using magnetic coupling. For example, the card reader 300 and the resonance circuit 110 of the wireless power receiver 100 wirelessly transmit or receive information using the local area wireless communications standard using magnetic coupling such as an NFC standard, or other similar wireless communications standard.

As illustrated in FIGS. 1 and 2, the wireless power receiver 100, according to an embodiment, receives wireless power using a single resonance circuit and provides the data in the non-contact manner.

Figure 3:
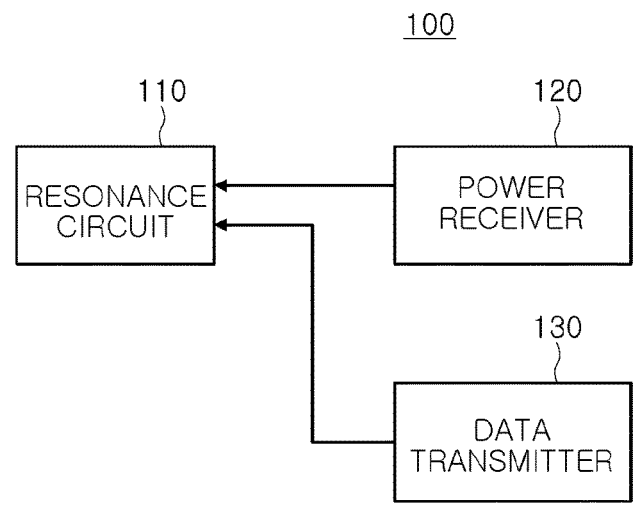
FIG. 3 is a configuration diagram of the wireless power receiver, according to an embodiment.

FIG. 3 is a configuration diagram of the wireless power receiver, according to an embodiment.

Referring to FIG. 3, the wireless power receiver 100 includes a resonance circuit 110, a power receiver 120, and a data transmitter 130.

The resonance circuit 110 includes a resonance tank (see dashed line configuration in FIGS. 1 and 2) including a coil and a capacitor.

In various embodiments, the resonance circuit 110 further includes a rectifying circuit. The rectifying circuit rectifies a current generated in the resonance tank. The rectifying circuit includes a plurality of switches, which are switched by a driving signal.

The resonance circuit 110 is magnetically coupled to a transmitting coil of an external wireless power transmitter according to a control of the power receiver 120 to receive wireless power.

Alternatively, the resonance circuit 110 is magnetically coupled to a coil of an external card reader according to a control of the data transmitter 130 to transmit the data.

The power receiver 120 controls the resonance circuit 110 so that the resonance circuit 110 interfaces with the wireless power transmitter to receive wireless power. The power receiver 120 supports a wireless charging standard, for example, at least one of Alliance for Wireless Power (A4WP), Wireless Power Consortium (WPC), and Power Matters Alliance (PMA).

The power receiver 120 enables the resonance circuit 110 to receive wireless power from the wireless power transmitter 200 (see FIG. 1) by providing a first driving signal for the plurality of switches of the resonance circuit 110 to receive wireless power. The resonance circuit 110 outputs wireless power according to the control of the power receiver 120, to an external device, such as, a portable terminal 10, as illustrated in FIG. 1.

The data transmitter 130 controls the resonance circuit 110 to wirelessly transmit the data.

The data transmitter 130 transmits the data to the external card reader, such as, the magnetic card reader, by providing a second driving signal to transmit the data to the plurality of switches of the resonance circuit 110.

For example, the data includes the card information and the second driving signal is a series of square waves for transmitting the card information. In one example, the series of square waves are values determined according to the card information to be transmitted. Therefore, the data transmitter 130 controls the external card reader to generate the square wave according to the card information to be transmitted.

In this case, the resonance circuit 110 is operated as a converter converting the square wave into a wireless communications waveform. That is, the rectifying circuit 112 of the resonance circuit 110 converts the data represented by the square wave into the wireless communications waveform.

According to an embodiment, the power receiver 120 and the data transmitter 130 each separately output a driving signal driving the rectifying circuit of the resonance circuit 110. In addition, in one illustrative example, the power receiver 120 and the data transmitter 130 are operated in a mutually exclusive manner. The power receiver 120 and the data transmitter 130 are operated in a mutually exclusive manner to enable the other not to perform a control for the resonance circuit 110 in a case in which one of the power receiver 120 or the data transmitter 130 controls an operation of the resonance circuit 110 because the power receiver 120 and the data transmitter 130 share one resonance circuit 110.

Figure 4:
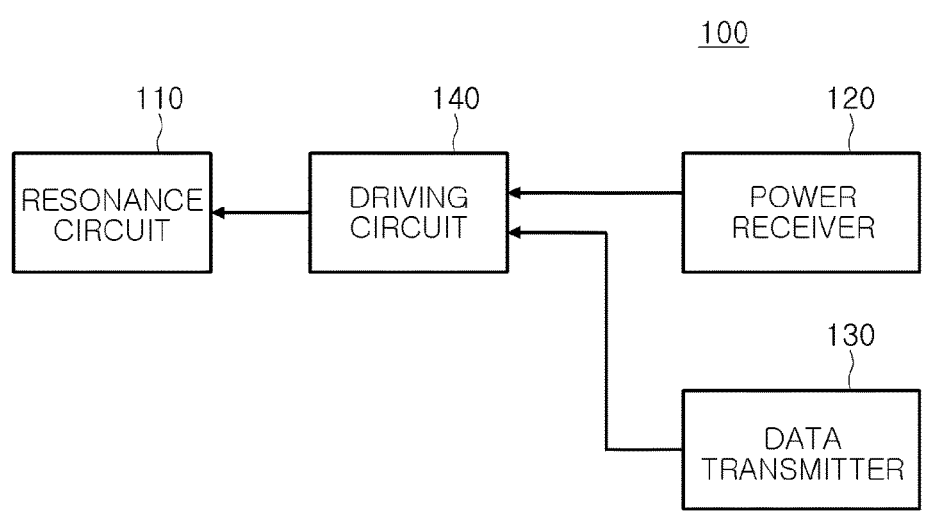
FIG. 4 is a configuration diagram of another wireless power receiver, according to an embodiment.

FIG. 4 is a configuration diagram of another wireless power receiver, according to an embodiment. The example of FIG. 4 relates to an embodiment that further includes a driving circuit 140.

Referring to FIG. 4, another example of the wireless power receiver 100 may include the resonance circuit 110, the power receiver 120, the data transmitter 130, and the driving circuit 140.

The resonance circuit 110 includes a resonance tank (see dashed line configuration in FIGS. 1 and 2) and a plurality of switches connected to the resonance tank.

The resonance circuit 110 is magnetically coupled to a transmitting coil of an external wireless power transmitter to receive wireless power or is magnetically coupled to a coil of an external card reader to transmit the data by receiving a driving signal of the driving circuit 140.

The driving circuit 140 applies the driving signal to the plurality of switches so that the resonance circuit 110 receives wireless power or transmits the data. The driving circuit 140 outputs the driving signal for the switch of the resonance circuit 110 according to a control of the power receiver 120 or the data transmitter 130.

According to an embodiment, the driving circuit 140 is implemented as an integrated circuit IC operated according to a preset specification, or other types of specifications. Therefore, the power receiver 120 or the data transmitter 130 do not directly output the driving signal, but control the driving circuit 140 to output the driving signal by providing to the driving circuit 140 a control signal.

For example, the power receiver 120 provides a control signal to receive wireless power, according to a specification of the driving circuit 140, to the driving circuit 140 to control the driving circuit 140 to receive power wirelessly. As another example, the data transmitter 130 produces a control signal to output data, according to the specification of the driving circuit 140, to the driving circuit 140 to control the driving circuit 140 to transmit the data.

Figure 5:
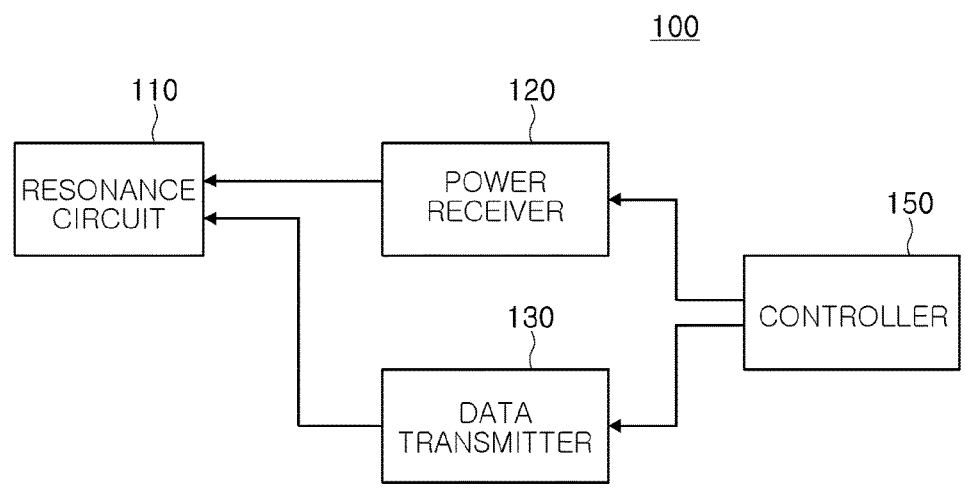
FIG. 5 is a configuration diagram of further another wireless power receiver, according to an embodiment.

FIG. 5 is a configuration diagram of further another wireless power receiver, according to an embodiment. The example of FIG. 5 relates to an embodiment in which a controller 150 is further included in the embodiment of FIG. 3 described above.

The controller 150 controls an operation of one of the power receiver 120 or the data transmitter 130. That is, because the power receiver 120 and the data transmitter 130 use one resonance circuit 110, the power receiver 120 and the data transmitter 130 are, in one example, operated in a mutually exclusive manner, and the controller 150 controls operations of the power receiver 120 and the data transmitter 130 so that the power receiver 120 or the data transmitter 130 use the resonance circuit 110.

According to an embodiment, the controller 150 provides mode selection information to the power receiver 120 or the data transmitter 130. The mode selection information is information about whether one function of a wireless power receiving mode and a data transmitting mode is activated, and one of the power receiver 120 or the data transmitter 130 are operated according to the mode selection information.

According to an embodiment, the wireless power receiver 100 produces or outputs the card information to an external magnetic card reader. To this end, the controller 150 produces card information to be transmitted to the data transmitter 130.

Figure 6:
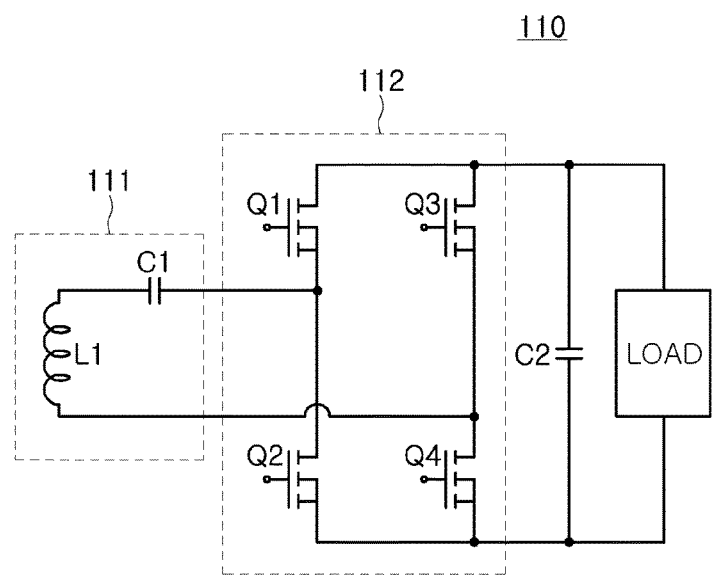
FIG. 6 is a circuit diagram of the wireless power receiver including a receiving resonator and a rectifying circuit, according to an embodiment.

FIG. 6 is a circuit diagram of the wireless power receiver including a receiving resonator and a rectifying circuit, according to an embodiment.

Referring to FIG. 6, the resonance circuit 110 includes a resonance tank 111 and a rectifying circuit 112.

The resonance tank 111 includes at least one coil L1 and at least one capacitor C1. The resonance tank 111 is magnetically coupled to the wireless power transmitter 200 to receive wireless power. Alternatively, the resonance tank 111 is magnetically coupled to the card reader to transmit data.

The rectifying circuit 112 includes a plurality of switches Q1, Q2, Q3, and Q4 connected to the resonance tank 111.

According to an embodiment, the plurality of switches Q1, Q2, Q3, and Q4 in the rectifying circuit 112 rectify a current received at the resonance circuit 110. That is, the plurality of switches Q1, Q2, Q3, and Q4 are operated according to the driving signal input from the power receiver 120 or the driving circuit 140 to perform a rectifying function.

According to another embodiment, the plurality of switches Q1, Q2, Q3, and Q4 are included in a converter converting the data, which is input as the driving signal into a wireless communications waveform. That is, the plurality of switches Q1, Q2, Q3, and Q4 are operated according to the driving signal input from the data transmitter 130 or the driving circuit 140 to convert the data into the wireless communications waveform.

According to an embodiment, the rectifying circuit 112 includes first and second switches Q1 and Q2 connected to one end of the resonance tank and third and fourth switches Q3 and Q4 connected to the other end of the resonance tank.

The rectifying circuit 112 performs a switching operation according to the driving signal to rectify the current received at the resonance tank 111. Alternatively, the rectifying circuit 112 performs the switching operation according to the driving signal to allow the resonance tank 111 to output the data information.

According to an embodiment, in the case in which the rectifying circuit 112 is operated by the driving signal according to a control of the power receiver 120, the rectifying circuit 112 performs the switching operation to wirelessly receive and rectify power. In an embodiment, the rectifying circuit 112 performs a rectifying operation.

According to another embodiment, in the case in which the rectifying circuit 112 is operated by the driving signal according to a control of the data transmitter 130, the rectifying circuit 112 performs the switching operation to transmit the data. In an embodiment, the rectifying circuit 112 is operated as the converter.

Although the rectifying circuit 112 is illustrated as a full-bridge circuit in the example illustrated in FIG. 6, the rectifying circuit 112 may also be implemented as a half-bridge circuit, or other equivalent circuit configuration.

Figure 7:
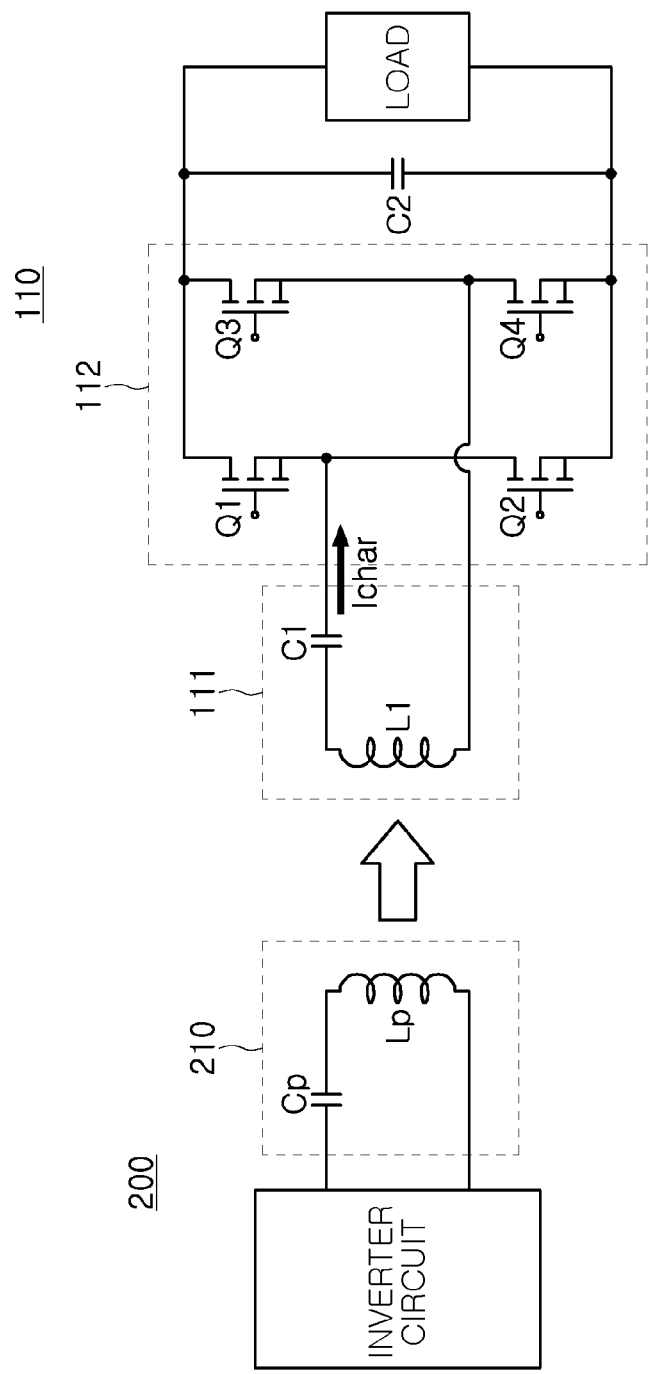
FIG. 7 is a circuit diagram illustrating a wireless power receiving function of a resonance circuit, according to an embodiment.
Figure 8:
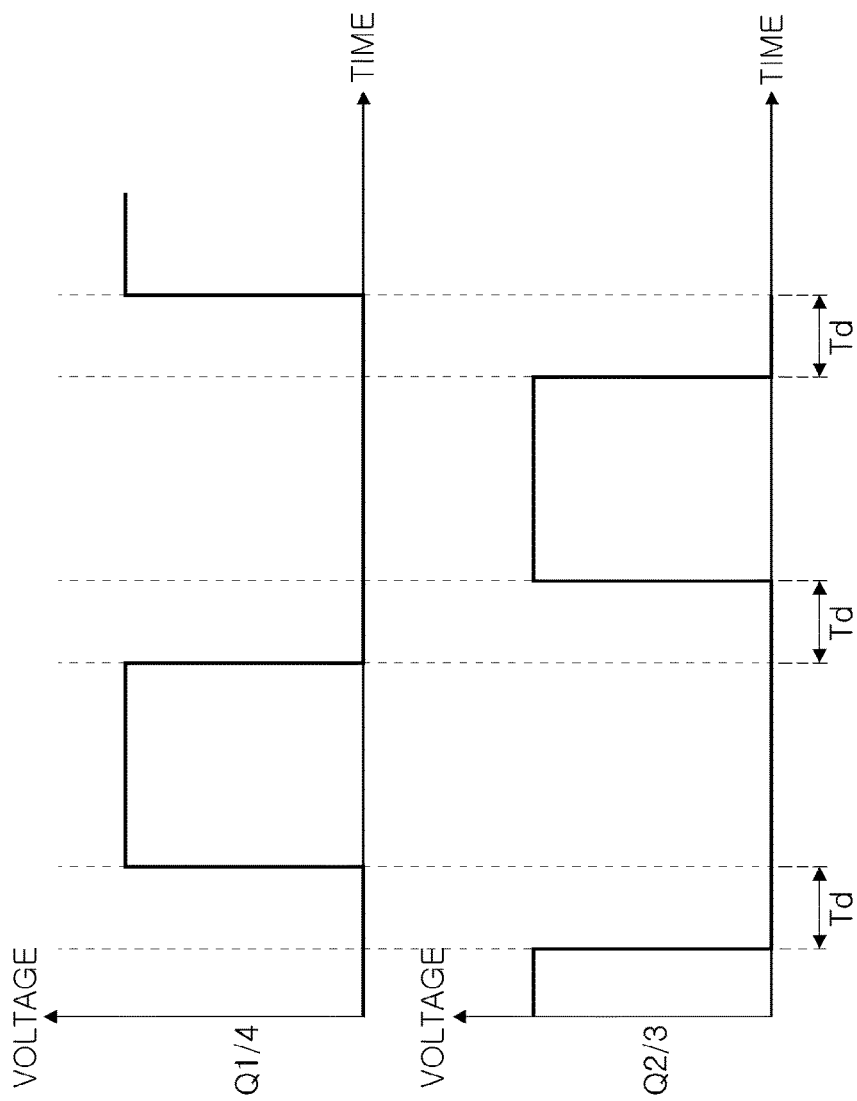
FIG. 8 is a graph illustrating an example of a driving signal of the rectifying circuit applied to the resonance circuit of FIG. 7, according to an embodiment.

FIG. 7 is a circuit diagram illustrating a wireless power receiving function of the resonance circuit, according to an embodiment, and FIG. 8 is a graph illustrating an example of a driving signal applied to the resonance circuit of FIG. 7, according to an embodiment.

Referring to FIGS. 7 and 8, a resonance tank 210 of the wireless power transmitter 200 and the resonance tank 111 of the resonance circuit 110 are magnetically coupled. Therefore, the resonance circuit 110 induces an alternating current Ichar for transferring power from the resonance tank 111 to the rectifying circuit 112.

The resonance circuit 110 rectifies the alternating current Ichar into a direct current using a switching operation performed at the rectifying circuit 112.

According to an embodiment, the resonance circuit 110 includes a full-bridge circuit as illustrated, and the switches Q1 to Q4 perform an alternative switching operation. FIG. 8 illustrates a driving signal for the alternative switching operation. As illustrated, after the switches Q1 and Q4 are operated for a predetermined time, the switches Q2 and Q3 are operated. Between switches of the respective switching operations, a predetermined dead time Td is present. The alternating current applied to the resonance tank 111 is rectified into the direct current by the switching operation described above. By using the rectified direct current, the wireless power receiver provides power to an external load, such as, an electronic device in which the wireless power receiver is mounted.

It may be appreciated from the embodiments described above in FIGS. 7 and 8 that the resonance circuit 110 receives wireless power.

Figure 9:
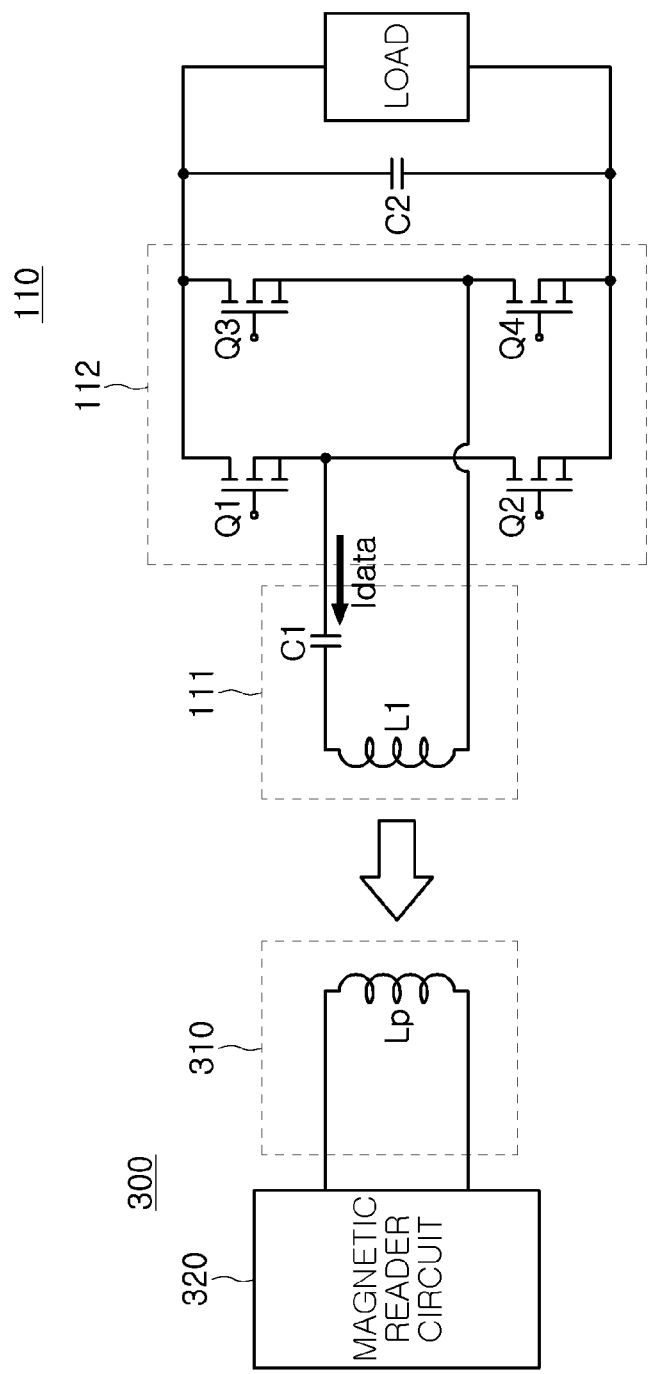
FIG. 9 is a circuit diagram illustrating a data providing function of the resonance circuit, according to an embodiment.

Furthermore, the resonance circuit 110 is further configured to transmit the data, and FIG. 9 is a circuit diagram illustrating a data providing function of the resonance circuit 110.

Referring to FIG. 9, the resonance circuit 110 performs a switching operation according to a driving signal. An alternating current data to transmit the data flows in the resonance tank 111 according to the switching operation and the coil L1 and capacitor C1 of the resonance tank 111 are magnetically coupled to a coil Lp of the card reader 300 to transmit data.

The card reader 300 includes a magnetic card reader device. As described above, because the magnetic card reader device uses a magnetic recognition scheme, the magnetic card reader device may include the coil Lp reacting to a magnetic strip of the card and a magnetic body.

Therefore, the resonance circuit 110 is magnetically coupled to the coil Lp reacting to the magnetic strip.

In a case of receiving power wirelessly, the resonance circuit 110 may use a frequency of 100 KHz to 205 KHz. Further, in a case of transmitting the data, the resonance circuit 110 uses a frequency band, which is differently set depending on an operating frequency of an external card reader and a typical card reader may be operated at a frequency band of 70 KHz, adjacent to a frequency band of 50 KHz to 100 KHz.

Therefore, one resonance circuit 110 performs the wireless power transmitting function or the data providing function without a separately complex resonance circuit conversion.

In addition, in a case in which power is received wirelessly, because factors such as impedance matching, are major factors in power reception, a relatively strict requirement may be imposed on factors such as impedance matching. However, because the data transmission simply transmits data, the strict requirements are not imposed on factors, such as the impedance matching. Therefore, even in a case in which the resonance circuit 110 is set to the frequency or the impedance matching which is effective to receive power wirelessly, the resonance circuit 110 may successfully provide the data to the external card reader 300.

Figure 10:
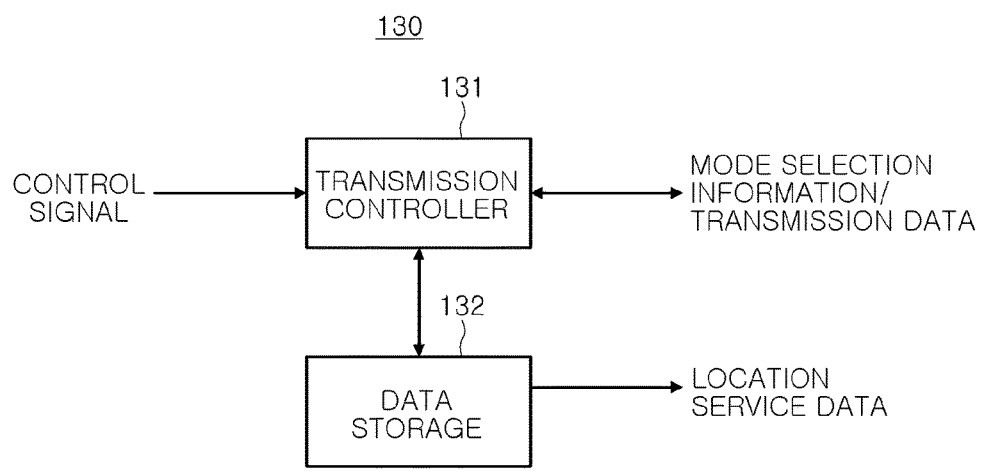
FIG. 10 is a circuit diagram illustrating an example of a data transmitter, according to an embodiment.

FIG. 10 is a circuit diagram illustrating an example of the data transmitter, according to an embodiment.

Referring to FIG. 10, the data transmitter 130 includes a transmission controller 131 and an data storage 132.

According to an embodiment, the transmission controller 131 is operated according to mode selection information input from the outside. In one example, the mode selection information is information to activate one function of a wireless power receiving mode and a data transmitting mode. Therefore, although not illustrated, the power receiver 120 may also be operated according to the mode selection information.

The transmission controller 131 confirms the mode selection information and obtains data to be transmitted from the data storage 132.

According to an embodiment, the transmission controller 131 is interfaced with the portable terminal 10 to generate or update the data. In the case in which the controller 150 is further included, the transmission controller 131 generates or updates the data through the controller 150.

For example, the portable terminal 10 includes an data obtaining processor, such as, a portable card reader, or an NFC module, and a predetermined program, such as, an application program, to provide the obtained data to the data transmission unit 130. The data transmission unit 130 stores the data provided from the portable terminal 10. The data includes, but it is not limited to, card classification information, card valid period information, password, authentication information, card company information, and a card number.

When the transmission controller 131 receives transmission data from the portable terminal 10, the transmission controller 131 confirms a card intended to be transmitted and obtains the data for the card from the data storage 132. Thereafter, the transmission controller 131 outputs a control signal to transmit the obtained data, such as, the card number. For example, because the data transmitted from the wireless power receiver 100 is data in which the card number is represented as a code of a binary form, the transmission controller 131 provides a driving signal or a control signal to transmit the code described above.

As set forth above, according to various embodiments, the power is received wirelessly or the data is provided using a single resonance circuit.

According to another embodiment, the card information is wirelessly transmitted to the magnetic card reader using the resonance circuit, without a separately additional apparatus.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power receiver, comprising:
   a resonance circuit comprising a resonance tank and a rectifying circuit, the rectifying circuit comprising switches;
   a power receiver configured to control the resonance circuit to receive wireless power by the resonance tank; and
   a data transmitter configured to control the resonance circuit to transmit data by the resonance tank, the data comprising card information,
   wherein the data transmitter provides a second driving signal to transmit the data to the switches, and the second driving signal is a series of square waves to transmit the card information.

2. The wireless power receiver of claim 1, wherein the power receiver provides a first driving signal for receiving wireless power to the switches.

3. The wireless power receiver of claim 1, wherein the rectifying circuit converts the data represented by the square waves into a wireless communications waveform.

4. The wireless power receiver of claim 1, wherein the power receiver operates mutually exclusively to the data transmitter.

5. The wireless power receiver of claim 2, wherein the resonance tank is configured to magnetically couple to a transmitting coil of an external wireless power transmitter.

6. The wireless power receiver of claim 2, wherein the resonance tank is configured to magnetically couple to a coil of an external magnetic card reader.

7. The wireless power receiver of claim 1, further comprising:
   a controller configured to control so that one of the power receiver or the data transmitter is operated.

8. A wireless power receiver, comprising:
   a resonance circuit comprising a resonance tank and switches connected to the resonance tank;
   a driving circuit configured to apply a driving signal to the switches so that the resonance circuit receives wireless power in a first mode and transmits data in a second mode;

a power receiver configured to provide a first control signal for receiving wireless power to the driving circuit; and a data transmitter configured to provide a second control signal for transmitting the data to the driving circuit, wherein the switches comprise first and second switches connected to one end of the resonance tank, and third and fourth switches connected to another end of the resonance lank, and wherein the power receiver generates the first control signal to operate the second and third switches after the first and fourth switches are operated.

9. The wireless power receiver of claim 8, wherein the switches are included in a converter converting the data input as the driving signal into a wireless communications waveform.

10. The wireless power receiver of claim 8, wherein the switches are included in a rectifying circuit rectifying a current received by the resonance tank.

11. The wireless power receiver of claim 8, wherein the resonance circuit receives wireless power using a frequency of 350 kHz or less, and transmits the data using a frequency of 50 kHz to 300 kHz.

12. A resonance circuit, comprising:

a resonance tank comprising a coil and a capacitor, the resonance tank configured to magnetically couple to a wireless power transmitter to receive wireless power and further configured to magnetically couple to a card reader to transmit data; and a rectifying circuit comprising switches connected to the resonance tank, the rectifying circuit configured to wirelessly receive or rectify the power and further configured to transmit the data based on a driving signal.

13. The resonance circuit of claim 12, wherein the rectifying circuit is further configured to perform a switching operation according to the driving signal to rectify a current received at the resonance tank.

14. The resonance circuit of claim 12, wherein the rectifying circuit is further configured to perform a switching operation according to the driving signal to allow the resonance tank to transmit the data or to receive the wireless power.

15. The resonance circuit of claim 12, wherein the switches are operated according to the driving signal input from a data transmitter or a power receiver.

16. The resonance circuit of claim 15, wherein the power receiver and the data transmitter operate in a mutually exclusive manner.

17. The resonance circuit of claim 15, wherein a driving circuit receives the driving signal from the power receiver or the data transmitter, and applies the driving signal to the switches so that the resonance circuit receives the wireless power or transmits the data.

18. The resonance circuit of claim 12, wherein first and second switches are connected to one end of the resonance tank and third and fourth switches are connected to another end of the resonance tank, wherein a control signal controls the second and third switches to operate after the first and fourth switches are operated.

19. The resonance circuit of claim 12, wherein the switches are in a converter configured to convert the data into a wireless communications waveform.

* * * * *